(No Model.) 2 Sheets—Sheet 1.
G. F. HUTCHINS.
WARP BEAM FOR LOOMS.
No. 548,442. Patented Oct. 22, 1895.
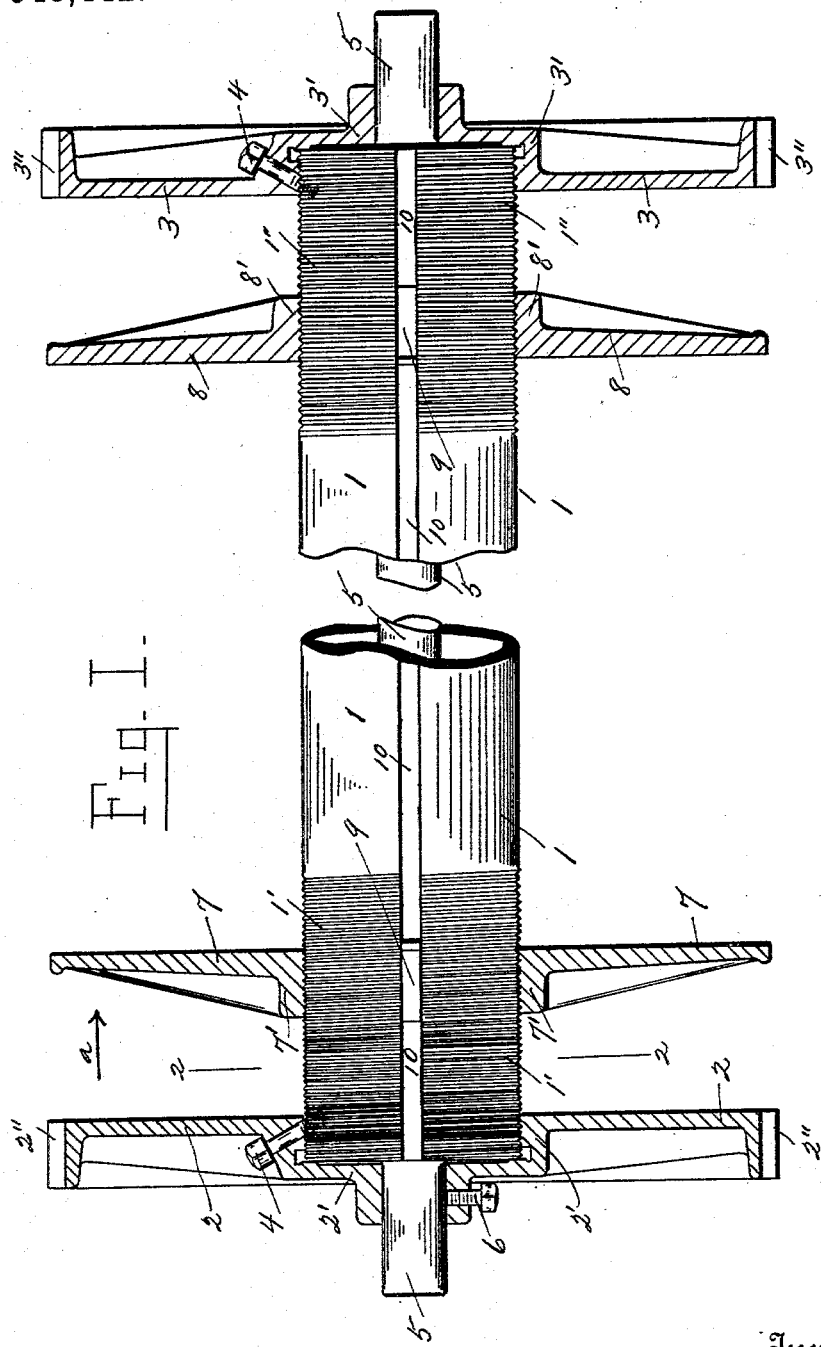
Fig. I.
Witnesses
Irving H. Verry.
H. Henry Ramsdell.
Inventor
George F. Hutchins
By his Attorney
John C. Dewey

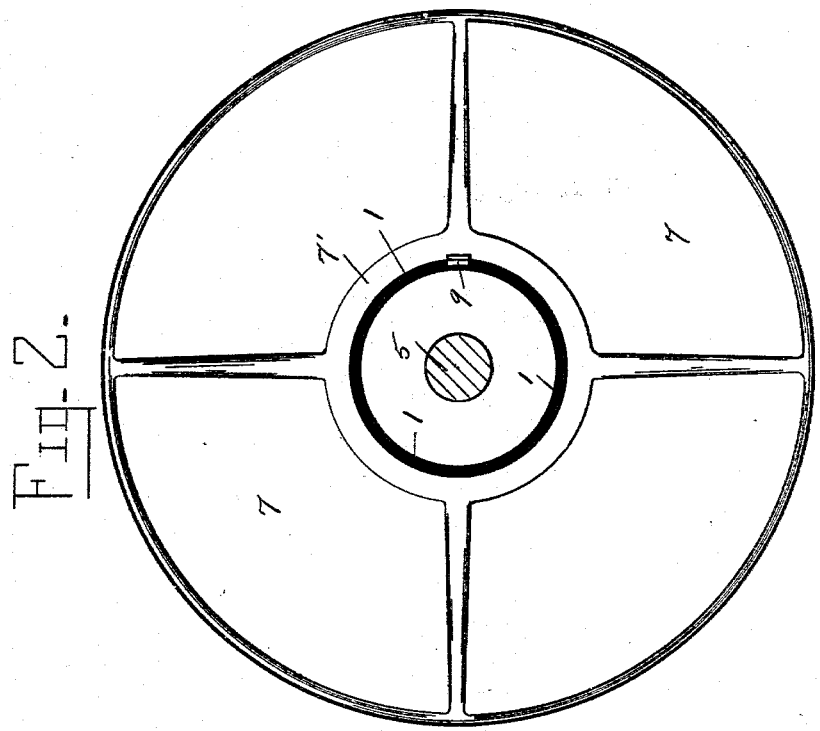

UNITED STATES PATENT OFFICE.

GEORGE F. HUTCHINS, OF WORCESTER, MASSACHUSETTS, ASSIGNOR TO THE KNOWLES LOOM WORKS, OF SAME PLACE.

WARP-BEAM FOR LOOMS.

SPECIFICATION forming part of Letters Patent No. 548,442, dated October 22, 1895.

Application filed April 10, 1895. Serial No. 545,125. (No model.)

*To all whom it may concern:*

Be it known that I, GEORGE F. HUTCHINS, a citizen of the United States, residing at Worcester, in the county of Worcester and State of Massachusetts, have invented certain new and useful Improvements in Warp-Beams for Looms, of which the following is a specification.

My invention relates to warp-beams for looms; and the object of my invention is to provide a warp-beam made entirely of metal and adapted to be used on looms on which are woven very heavy material, such as heavy duck cloth, &c., which cause a severe strain on the warp-beam.

My invention consists in certain novel features of construction of my improved warp-beam, as will be hereinafter fully described, and the nature thereof indicated by the claim.

Referring to the drawings, Figure 1 is a sectional elevation of my improved warp-beam, and Fig. 2 is a cross-section taken on line 2 2, Fig. 1, looking in the direction of arrow *a*, same figure.

In the accompanying drawings, 1 is the warp-beam body, made of iron pipe, preferably five or six inches in diameter; but the size of the pipe may be varied, according to the length of the beam and the strain to be put upon it.

One end of the pipe or beam 1 is provided with an external right-hand screw-thread 1' thereon, and the other end with an external left-hand screw-thread 1''.

One of the outside beam-heads, as 2, has the central portion or hub 2' thereof recessed or cored out to form a chamber, which is provided with an internal right-hand screw-thread, and said beam-head 2 is screwed onto the right-hand screw-threaded end 1' of the pipe 1 until the end of the pipe butts against the end of the chamber in the hub, as shown. The other outside beam-head, as 3, has the central portion or hub 3' thereof recessed or cored out to form a chamber which is provided with an internal left-hand screw-thread, and said beam-head 3 is screwed onto the left-hand screw-threaded end 1'' of the pipe 1 until the end of the pipe butts against the end of the chamber in the hub, as shown.

Both beam-heads 2 and 3 are secured on the ends of the beam 1 and prevented from turning off in this instance by bolts or screws 4, which extend through holes in the hubs of said heads and are tapped into the ends of the beam 1, as shown in Fig. 1.

The peripheries of the outside beam-heads 2 and 3 are in this instance provided with teeth 2'' and 3'', which mesh into let-off pinions (not shown) in the ordinary way.

A central shaft 5 extends through the beam 1 and the ends thereof extend beyond the hubs of the outside beam-heads 2 and 3, as shown in Fig. 1, to act as journals for the warp-beam. A bolt 6, tapped into the hub of one of the outside beam-heads, as 2, secures the shaft 5 in place.

Mounted upon the beam 1, between the outside beam-heads 2 and 3, are the inside beam-heads 7 and 8, the hubs 7' and 8' of which are internally screw-threaded and adapted to turn on the screw-threads on the ends of the beam 1 to adjust the distance between the inner ends 7 and 8, as desired.

In order to hold the beam-heads 7 and 8 in their adjusted positions and prevent them from turning on the beam 1, I employ in this instance a key 9 for each beam-head. The key is adapted to slide in a longtudinal external groove 10, made in the beam 1, and to enter a corresponding groove in the hub of the inner beam-head, as shown in Fig. 2.

The advantages of my improved beam-head will be readily appreciated by those skilled in the art.

By providing the pipe or beam 1 with a right-hand screw-thread on one end and a left-hand screw-thread on the other end, and screwing on the outside beam-heads, as above described, until the ends of the pipe 1 butt against the ends of the chambers or recesses in the hubs, and arranging the warp-beam on the loom so that the strain of the warp on the pipe or beam 1 as the outside beam-heads are held by the let-off pinions will tend to turn the pipe 1 to screw the threaded ends thereof into the threaded hubs of said beam-heads, it will be seen that by reason of the beam-heads being already screwed up to butt against the ends of the pipe 1 any revolution of the pipe or beam 1 by the strain of the warp independently of the revolution of the outside beam-heads is absolutely prevented, no matter how great a strain there is on the warp. This is an important feature of my improved warp-beam.

The details of construction of my warp-beam may be varied, if desired. For instance, the central shaft 5 need not extend through the beam 1; but two short journals may be secured in the hubs of the outside beam-heads 2 and 3, if preferred.

Having thus described my invention, what I claim as new, and desire to secure by Letters Patent, is—

In a warp beam for looms, &c., the combination with a metal pipe or cylinder forming the body of the beam, and provided with a longitudinal groove and a right hand screw thread on one end, and a left hand screw thread on the other end, of two outside beam heads, each having the central portion thereof recessed or cored out to form a chamber, which is provided with an internal screw thread adapted to be screwed on to one end of said metal pipe until the end of the pipe butts against the end of said chamber, and two inside beam heads, mounted on said pipe, and in screw threaded engagement therewith, and adapted to be screwed toward each other, and away from each other, for the purpose stated and the hub of each provided with a recess, and a key fitting within the longitudinal groove of the cylinder and in the recess of each hub, substantially as set forth.

GEORGE F. HUTCHINS.

Witnesses:
JOHN C. DEWEY,
M. J. GALVIN.